(12) United States Patent
Ushio et al.

(10) Patent No.: US 12,023,826 B2
(45) Date of Patent: Jul. 2, 2024

(54) METHOD FOR SUPPLYING RESIN, METHOD FOR MANUFACTURING RESIN MOLDED PRODUCT, AND RESIN MOLDING APPARATUS

(71) Applicant: TOWA Corporation, Kyoto (JP)

(72) Inventors: Haruka Ushio, Kyoto (JP); Masayuki Katayama, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 0 days.

(21) Appl. No.: 17/494,860

(22) Filed: Oct. 6, 2021

(65) Prior Publication Data

US 2022/0118656 A1 Apr. 21, 2022

(30) Foreign Application Priority Data

Oct. 19, 2020 (JP) ................... 2020-175595

(51) Int. Cl.
*B29C 31/06* (2006.01)
(52) U.S. Cl.
CPC .................. *B29C 31/068* (2013.01)
(58) Field of Classification Search
CPC ... B29C 43/34; B29C 44/461; B29C 49/4205; B29C 31/065; B29C 31/02; B29C 45/68; B29C 2045/6785; B29C 31/068
See application file for complete search history.

(56) References Cited

U.S. PATENT DOCUMENTS

| | | | |
|---|---|---|---|
| 6,398,085 B2 * | 6/2002 | Foster | B05C 17/00516 |
| | | | 222/326 |
| 2006/0127153 A1 * | 6/2006 | Menchik | G01G 17/06 |
| | | | 400/62 |
| 2009/0200704 A1 * | 8/2009 | Yamada | B29C 43/34 |
| | | | 264/272.11 |
| 2015/0037445 A1 * | 2/2015 | Murphy | B29C 64/106 |
| | | | 425/131.1 |
| 2020/0038891 A1 | 2/2020 | Tojo et al. | |
| 2020/0215567 A1 | 7/2020 | Houlbrook et al. | |

FOREIGN PATENT DOCUMENTS

| | | |
|---|---|---|
| CN | 109317357 | 2/2019 |
| CN | 110665740 | 1/2020 |
| JP | 2012126075 | 7/2012 |

OTHER PUBLICATIONS

Essential Craftsman, "Up Your Caulking Game Ep 86", available at https://www.youtube.com/watch?v=nefpwM56E5k, Sep. 5 2020 (Year: 2020).*

"Office Action of Korea Counterpart Application" with English translation thereof, issued on Apr. 6, 2023, p. 1-p. 11.

* cited by examiner

*Primary Examiner* — Stella K Yi
(74) *Attorney, Agent, or Firm* — JCIPRNET (57) ABSTRACT

Provided a method for supplying a resin by which appropriate replacement of a cartridge enables resin supply to be performed appropriately. The method for supplying a resin includes: a primary resin supplying step of supplying a liquid resin contained in a first cartridge to a supply target, the first cartridge having a remaining amount of liquid resin smaller than a target supply amount appropriate for one-time resin supply to the supply target; a cartridge replacing step of replacing, after the primary resin supplying step, the first cartridge with a second cartridge already subjected to dripping out; and a secondary resin supplying step of supplying a liquid resin contained in the second cartridge to the supply target after the cartridge replacing step.

8 Claims, 7 Drawing Sheets

METHOD FOR SUPPLYING RESIN, METHOD FOR MANUFACTURING RESIN MOLDED PRODUCT, AND RESIN MOLDING APPARATUS

CROSS-REFERENCE TO RELATED APPLICATION

This application claims the priority benefit of Japanese Application Serial No. 2020-175595, filed on Oct. 19, 2020. The entirety of each of the above-mentioned patent application is hereby incorporated by reference herein and made a part of this specification.

BACKGROUND

Technical Field

The disclosure relates to a method for supplying a resin, method for manufacturing a resin molded product, and a resin molding apparatus.

Related Art

Patent literature 1 discloses a liquid-resin supply apparatus that supplies a liquid resin to a workpiece holding a semiconductor chip on a carrier plate. In the liquid resin supply apparatus, a syringe supply unit that holds a syringe for replacement is arranged at a dispensing unit that discharges and supplies the liquid resin with which the syringe is filled to the workpiece. When a remaining amount of liquid resin in the syringe is small, the dispensing unit can receive the syringe for replacement from the syringe supply unit to discharge and supply a predetermined amount of liquid resin to the workpiece held at a liquid discharge location.

LITERATURE OF RELATED ART

Patent Literature

[Patent literature 1] Japanese Patent Laid-Open No. 2012-126075

However, Patent literature 1 does not describe a specific method for replacing a syringe and continuing resin supply when a remaining amount of resin in the syringe is used up during resin supply to one workpiece. In other words, a specific technology for replacing a syringe to perform resin supply in such a case is not currently proposed.

The disclosure is made with consideration for such a circumstance described above, and the disclosure provides a method for supplying a resin, a method for manufacturing a resin molded product, and a resin molding apparatus that are capable of supplying a resin appropriately.

SUMMARY

According to an embodiment of the disclosure, a method for supplying a resin includes: a primary resin supplying step of supplying a liquid resin contained in a first cartridge to a supply target, the first cartridge having a remaining amount of liquid resin smaller than a target supply amount appropriate for one-time resin supply to the supply target; a cartridge replacing step of replacing, after the primary resin supplying step, the first cartridge with a second cartridge already subjected to dripping out; and a secondary resin supplying step of supplying a liquid resin contained in the second cartridge to the supply target after the cartridge replacing step is provided.

In addition, according to an embodiment of the disclosure, there is provided a method for manufacturing a resin molded product in which the resin molded product is manufactured using the liquid resin supplied by the method for supplying a resin.

In addition, according to an embodiment of the disclosure, there is provided a resin molding apparatus including: a molding die including an upper die and a lower die which faces the upper die; a die clamping mechanism that clamps the molding die; and a liquid resin supplying mechanism that supplies a liquid resin which is to be used in the molding die. The liquid resin supplying mechanism supplies a liquid resin contained in a first cartridge to a supply target, the first cartridge containing a remaining amount of liquid resin smaller than a target supply amount appropriate for one-time resin supply to the supply target, replaces the first cartridge with a second cartridge already subjected to dripping out, and supplies a liquid resin contained in the second cartridge to the supply target.

DESCRIPTION OF THE EMBODIMENTS

According to an embodiment of the disclosure, appropriate replacement of a cartridge enables resin supply to be performed appropriately.

Embodiments of the disclosure will be described in detail with reference to the accompanying figures. Moreover, the same reference signs are assigned to the same or equivalent parts in the drawings, and thus the description thereof is not repeatedly provided. Moreover, in this application document, the term "liquid" in liquid resin means that the liquid resin has a liquid phase at room temperature and has fluidity. In addition, in the following description, two directions orthogonal to each other on a horizontal plane are defined as an X direction and a Y direction, respectively, and a rotational direction around a rotational axis parallel to a Z direction is defined as a θ direction (refer to FIG. 1).

Overall Configuration of Resin Molding Apparatus 1

A configuration of the resin molding apparatus 1 of the embodiment is described with reference to FIGS. 1 to 3. The resin molding apparatus 1 illustrated in FIG. 1 is the resin molding apparatus 1 that performs resin molding by a compression molding method.

Figure 1:
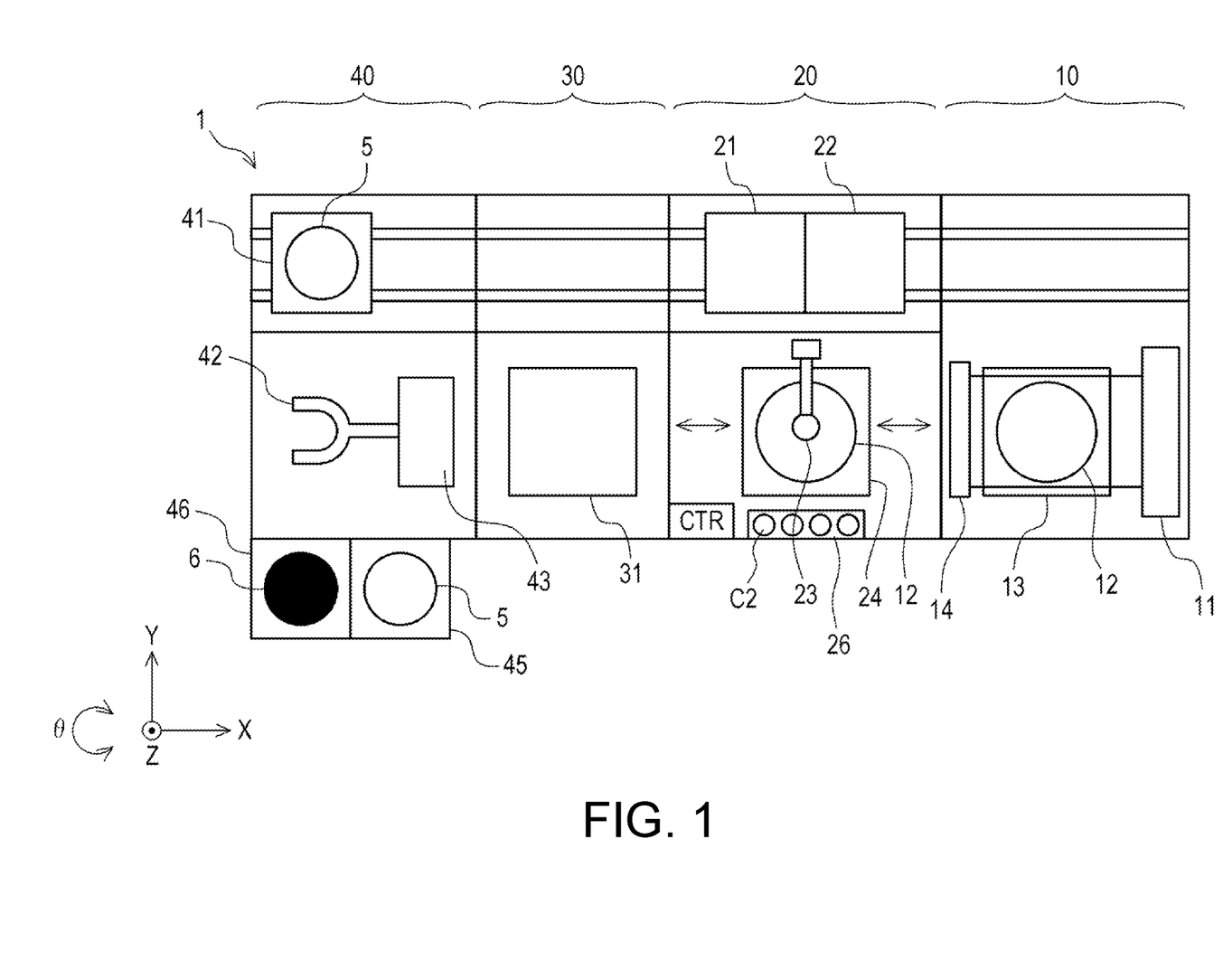
FIG. 1 is a plan view schematically illustrating an overall configuration of a resin molding apparatus according to an embodiment of the disclosure.

As illustrated in FIG. 1, the resin molding apparatus 1 of the embodiment includes a release film cutting module 10, a resin supply module 20, a resin molding module 30, and a transport module 40. The modules are individually separated from each other; however, the modules are attachable to and detachable from a contiguous module and can increase and decrease in the number thereof. For example, the embodiment can have a configuration in which two or three resin molding modules 30 are disposed between the resin supply module 20 and the transport module 40.

As illustrated in FIG. 1, the release film cutting module 10 mainly includes a roll-shaped release film 11, a film placing board 13, and a film gripper 14. The film gripper 14 unrolls a long release film from the roll-shaped release film 11 and disposes a part of the release film to cover the film placing board 13. The release film is cut by a cutter into a circular shape, and thereby a circular release film 12 can be obtained. The film placing board 13 can move in the X, Y, and Z directions and can move between the release film cutting module 10 and the resin supply module 20. Moreover, a shape of the release film 12 is not particularly limited to the circular shape and may be a rectangular shape, for example.

As illustrated in FIG. 1, the resin supply module 20 mainly includes a resin transporting mechanism 21, a film collecting mechanism 22, a liquid resin discharging mechanism 23, a film suctioning board 24, and a controller CTR. The resin transporting mechanism 21 and the film collecting mechanism 22 are configured to be integrated with each other and can move between the release film cutting module 10 and the resin molding module 30 described later. The resin transporting mechanism 21 can transport the release film 12, to which a liquid resin 70 has been supplied, to a molding die 31 described later. The film collecting mechanism 22 can collect the used release film 12 from the inside of the molding die 31. As illustrated in FIG. 2, the liquid resin discharging mechanism 23 can supply the liquid resin 70 from a nozzle N onto the release film 12. The film suctioning board 24 can suction and hold the cut release film 12. A weighing instrument 25 is arranged below the film suctioning board 24, and the weighing instrument 25 can measure weight of the liquid resin 70 discharged from the release film 12. The controller CTR can control operations of each part of the liquid resin discharging mechanism 23.

The liquid resin discharging mechanism 23 can discharge the liquid resin 70 contained in a cartridge C. Specifically, the liquid resin discharging mechanism 23 can hold the cartridge C in a state where the nozzle N faces down. The liquid resin discharging mechanism 23 can push out the liquid resin 70 contained in the cartridge C from above the nozzle N by using a rod 23*b* which can be lifted and lowered by a drive force from a motor 23*a*, thereby, discharging the liquid resin 70 downward from the nozzle N. A moving mechanism 23*c* enables the liquid resin discharging mechanism 23 to move in a horizontal direction (X direction or Y direction) and a vertical direction (Z direction). The liquid resin discharging mechanism 23 can discharge the liquid resin 70 at any locations or can move while discharging the liquid resin 70, by combining the drive of the rod 23*b* and the movement by the moving mechanism 23*c*. Note that, the liquid resin discharging mechanism 23 and the rod 23*b* according to the embodiment are an example of a liquid resin supplying mechanism and a supply member according to the disclosure, respectively.

In addition, the liquid resin discharging mechanism 23 includes a resin level detecting sensor 23*d* and a rod location detecting sensor 23*e* as sensors which detect the remaining amount of liquid resin 70 contained in the cartridge C.

Figure 2A:
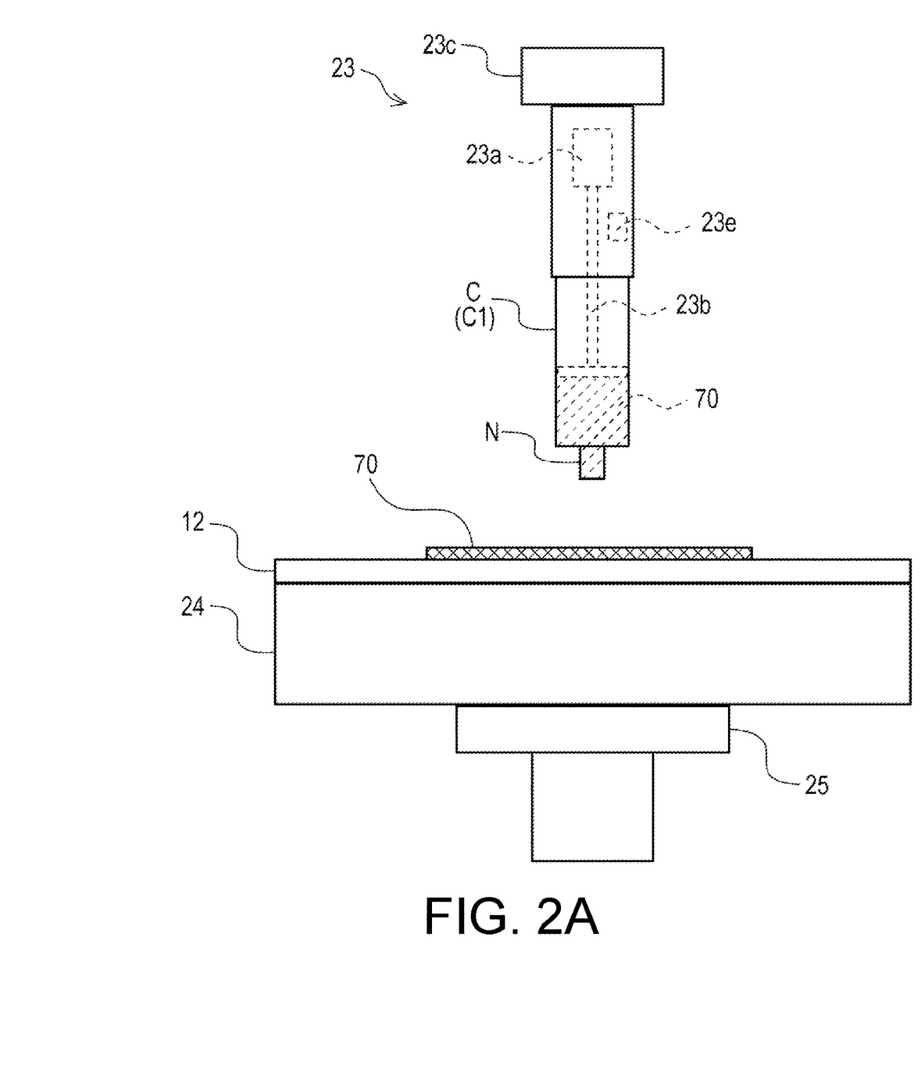
FIG. 2A is a side view illustrating a schematic configuration of a part of a resin supply module.
Figure 2B:
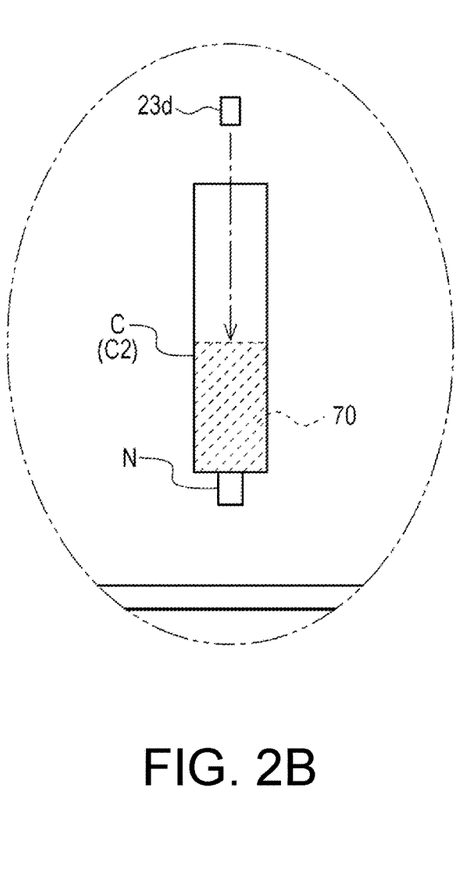
FIG. 2B is a side view illustrating an example of detection performed by a resin level detecting sensor.

The resin level detecting sensor 23*d* illustrated in FIG. 2B can measure a distance from the top portion of the cartridge C held by the liquid resin discharging mechanism 23 to a top surface of the liquid resin 70 contained in the cartridge C. Examples of the resin level detecting sensor 23*d* can include various types of distance sensors such as an optical distance sensor, an ultrasonic distance sensor, or electric wave type distance sensor. The amount (remaining amount) of the liquid resin 70 contained in the cartridge C can be calculated from the distance (location of the top surface) to the top surface of the liquid resin 70 measured by the resin level detecting sensor 23*d*, a sectional area of the cartridge C, and specific gravity of the liquid resin 70.

In addition, the rod location detecting sensor 23*e* illustrated in FIG. 2A can detect a location of the rod 23*b*. Examples of the rod location detecting sensor 23*e* can include various types of location sensors such as a potentiometer type location sensor, an optical location sensor, or a magnetic location sensor. The amount (remaining amount) of the liquid resin 70 contained in the cartridge C can be calculated based on an initial remaining amount of liquid resin measured by the resin level detecting sensor 23*d* and the location of the rod 23*b* detected by the rod location detecting sensor 23*e*.

In the embodiment, the resin level detecting sensor 23*d* measures the remaining amount of liquid resin 70 (initial remaining amount of resin) contained in the cartridge C (that is, new cartridge C) from which the liquid resin 70 is not pushed out by the rod 23*b*. In the embodiment, the rod location detecting sensor 23*e* measures the remaining amount of liquid resin 70 contained in the cartridge C from which the liquid resin 70 starts to be pushed out by the rod 23*b*.

Figure 3:
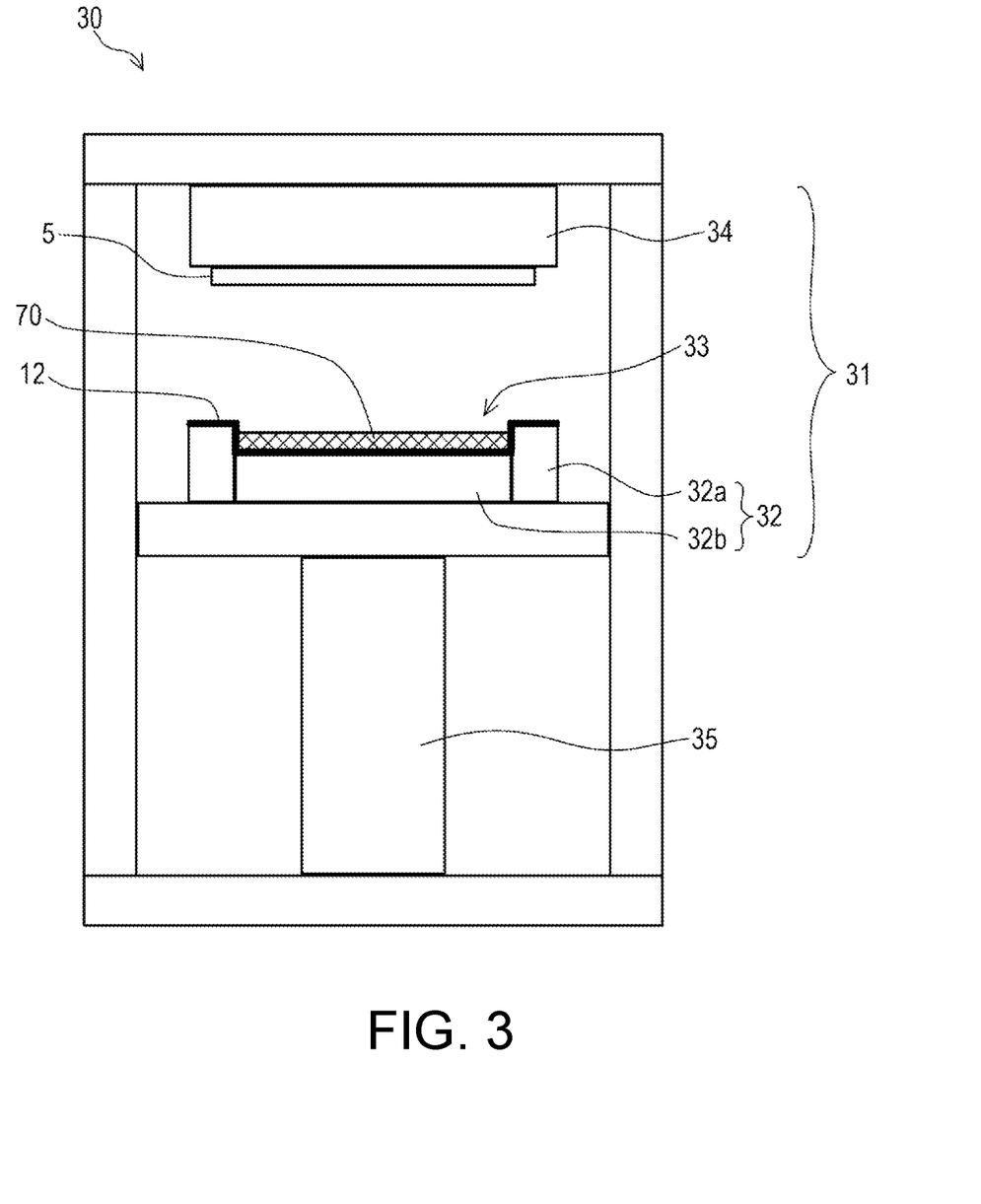
FIG. 3 is a side view illustrating a schematic configuration of a resin molding module.

As illustrated in FIGS. 1 and 3, the resin molding module 30 mainly includes the molding die 31 and a die clamping mechanism 35. The molding die 31 includes an upper die 34 and a lower die 32 which faces the upper die 34. The lower die 32 is configured to have a side member 32*a* configuring a side surface of a cavity 33 and a bottom member 32*b* configuring a bottom surface of the cavity 33. The recessed cavity 33 into which the liquid resin 70 is contained is formed by the side member 32*a* and the bottom member 32*b*. In addition, the side member 32*a* and the bottom member 32*b* have suction grooves (not illustrated) for suctioning the release film 12. The release film 12 to which the liquid resin 70 is supplied from the resin supply module 20 by the resin transporting mechanism 21 is transported to the molding die 31 and is disposed on the cavity 33 of the lower die 32. The die clamping mechanism 35 clamps the molding die 31 in the resin molding module 30, and thereby resin molding can be performed on a pre-molded substrate 5 on which the chip as a molding target object is mounted, and a molded substrate 6 on which a chip is resin-sealed can be formed. Examples of the substrate can include a semiconductor substrate such as a silicon wafer, a lead frame, a printed circuit board, a metal substrate, a resin substrate, a glass substrate, a ceramic substrate, and the like. In addition, the substrate may be a carrier which is used in fan-out wafer-level packaging (FOWLP) or fan-out panel-level packaging (FOPLP). Further, a substrate having already-formed wiring may be used, or a substrate without wiring may also be used.

As illustrated in FIG. 1, the transport module 40 mainly includes a substrate loader 41, a suction hand 42, a suction hand moving mechanism 43, a pre-molded substrate accommodating unit 45, and a molded substrate accommodating unit 46. The substrate loader 41 can hold the substrate and can move between the resin molding module 30 and the transport module 40. The suction hand 42 is arranged at the suction hand moving mechanism 43, and the suction hand moving mechanism 43 can move the suction hand 42 in the X, Y, and Z directions and can rotate the suction hand 42 in the 0 direction. Regarding rotation, the suction hand moving mechanism can also rotate the suction hand 42 in the horizontal direction and can also rotate and invert the suction hand 42 in the vertical direction. The suction hand 42 can suction and hold the pre-molded substrate 5 accommodated in the pre-molded substrate accommodating unit 45 and can transport the pre-molded substrate 5 to the substrate loader 41 by the suction hand moving mechanism 43. In addition, the suction hand 42 can suction and hold the molded substrate 6 held by the substrate loader 41 and can accommodate the molded substrate 6 in the molded substrate accommodating unit 46 by the suction hand moving mechanism 43.

Method for Manufacturing Resin Molded Product Using Resin Molding Apparatus 1

Next, an example of the method for manufacturing a resin molded product of the embodiment using the resin molding apparatus 1 of the embodiment will be described with reference to FIGS. 1 to 4. In the embodiment, a circular wafer is described as a substrate on which a chip is mounted; however, the substrate is particularly limited to the wafer and may have a rectangular shape.

First, as illustrated in FIG. 1, the suction hand 42 is inserted below the chip-mounted pre-molded substrate 5 accommodated in the pre-molded substrate accommodating unit 45, suctions the pre-molded substrate 5, and then picks up the pre-molded substrate 5 from the pre-molded substrate accommodating unit 45. Here, the pre-molded substrate 5 is picked up from the pre-molded substrate accommodating unit 45 in a state where a chip-mounted side thereof is on an upper side.

Next, the substrate suctioned to the suction hand 42 is inverted such that the chip-mounted side is on a lower side. Besides, the suction hand moving mechanism 43 moves the suction hand 42, and the pre-molded substrate 5 is delivered onto the substrate loader 41 in a state where a chip-mounted surface of the substrate suctioned to the suction hand 42 is on the lower side.

At that time, in the release film cutting module 10, the release film 12 is cut. The film gripper 14 unrolls the roll-shaped release film 11 over the film placing board 13, and a cutter (not illustrated) cuts the release film 11 to form the circular release film 12.

The film placing board 13 that suctions and holds the release film 12 moves to a front side of the resin transporting mechanism 21. The resin transporting mechanism 21 moves above the film placing board 13, receives the release film, and transports the release film 12 to the film suctioning board 24 of the resin supply module 20. The resin transporting mechanism 21 comes into a state of locating the release film 12 above the film suctioning board 24. The film suctioning board 24 receives the release film 12 from the resin transporting mechanism 21 and then suctions and holds the release film 12.

Figure 4:
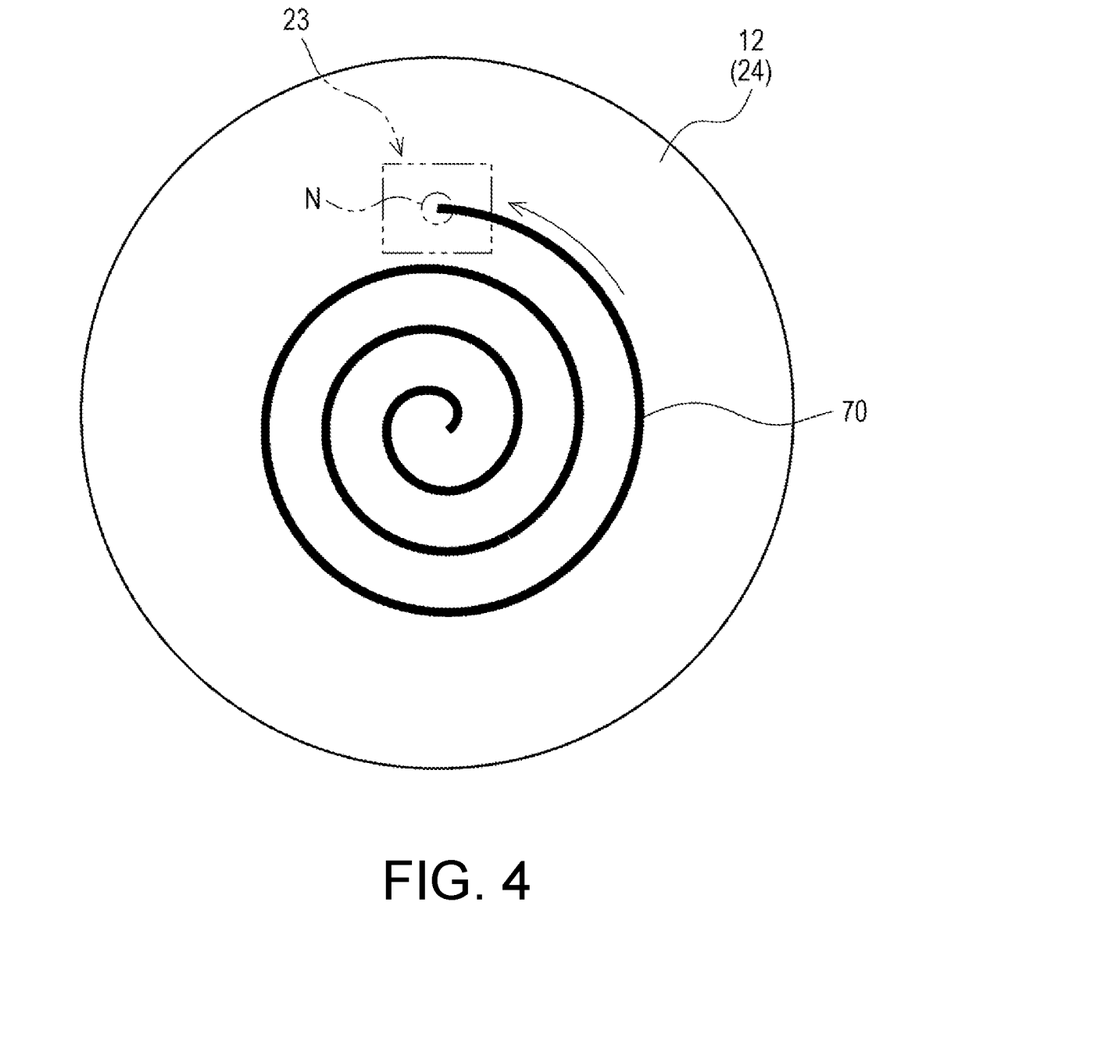
FIG. 4 is a plan view schematically illustrating an example of resin supply performed by a liquid resin discharging mechanism.

The release film 12 is suctioned and held to the film suctioning board 24, and then the liquid resin discharging mechanism 23 discharges the liquid resin 70 on the release film 12. As illustrated in FIG. 4, the liquid resin discharging mechanism 23 discharges the liquid resin 70 while moving in the horizontal direction (X direction and Y direction) along a predetermined route. In the embodiment, the liquid resin discharging mechanism 23 moves along a helical route, thereby, supplying the liquid resin 70 in a helical shape on the release film 12. The weighing instrument 25 illustrated in FIG. 2A measures weight of the liquid resin 70 supplied on the release film 12. Note that, the release film 12 according to the embodiment is an example of a supply target according to the disclosure. In addition, a method for supplying the liquid resin 70 by the liquid resin discharging mechanism 23 will be described below in detail.

The release film 12, to which a target supply amount (target weight) of liquid resin 70 has been supplied, is transported to the molding die 31. The resin transporting mechanism 21 transports the release film 12 to a space between the upper die 34 and the lower die 32 of the resin molding module 30. Moreover, before the release film 12 is disposed in the molding die 31, the substrate loader 41 holding the pre-molded substrate 5 is moved to a space between the upper die 34 and the lower die 32 and disposes the pre-molded substrate 5 on the upper die 34 such that the chip-mounted side is on the lower side.

As illustrated in FIG. 3, the release film 12 transported to the space between the upper die 34 and the lower die 32 by the resin transporting mechanism 21 is disposed in the cavity 33 formed by the side member 32a and the bottom member 32b of the lower die 32. The release film 12 is disposed in the cavity 33, and then the release film 12 is suctioned by suction grooves (not illustrated) of the side member 32a and the bottom member 32b.

As illustrated in FIG. 3, the release film 12 is suctioned and held by the cavity 33, and then the molding die 31, to which the release film 12 has been transported, is clamped so as to perform resin molding. Specifically, the die clamping mechanism 35 lifts the lower die 32. Consequently, the upper die 34 and the lower die 32 approach each other to be clamped, and the chip attached to an undersurface of the pre-molded substrate 5 is immersed into the liquid resin 70 in the cavity 33. In this state, the liquid resin 70 is heated and cured, and thereby resin molding of the pre-molded substrate 5 can be performed, and the molded substrate 6 having the resin-sealed chip can be manufactured. After the resin molding, the die clamping mechanism 35 lowers the lower die 32. Consequently, the upper die 34 and the lower die 32 are separated from each other and the die is opened.

The molded substrate 6 is picked up from the upper die 34 by the substrate loader 41 and is held taking a chip-mounted side as the lower side. Then, the substrate loader 41 moves from the resin molding module 30 to the transport module 40. Here, the release film 12 remaining in the cavity 33 is collected by the film collecting mechanism 22 and is discarded to an unnecessary film box (not illustrated).

The molded substrate 6 held by the substrate loader 41 is transported to the transport module 40 and, then, is suctioned and held by the suction hand 42 in a state where the chip-mounted side is put on the lower side by the suction hand 42. Then, the molded substrate 6 suctioned to the suction hand 42 is inverted such that the chip-mounted side of the molded substrate 6 is on the upper side, and the suction hand moving mechanism 43 moves the suction hand 42. Besides, the suction hand 42 accommodates the molded substrate 6 into the molded substrate accommodating unit 46 in the state where the chip-mounted side is on the upper side.

Method for Supplying Resin by Liquid Resin Discharging Mechanism 23 Hereinafter, a method for supplying the liquid resin 70 (method for supplying a resin) by the liquid resin discharging mechanism 23 will be specifically described.

Figure 5:
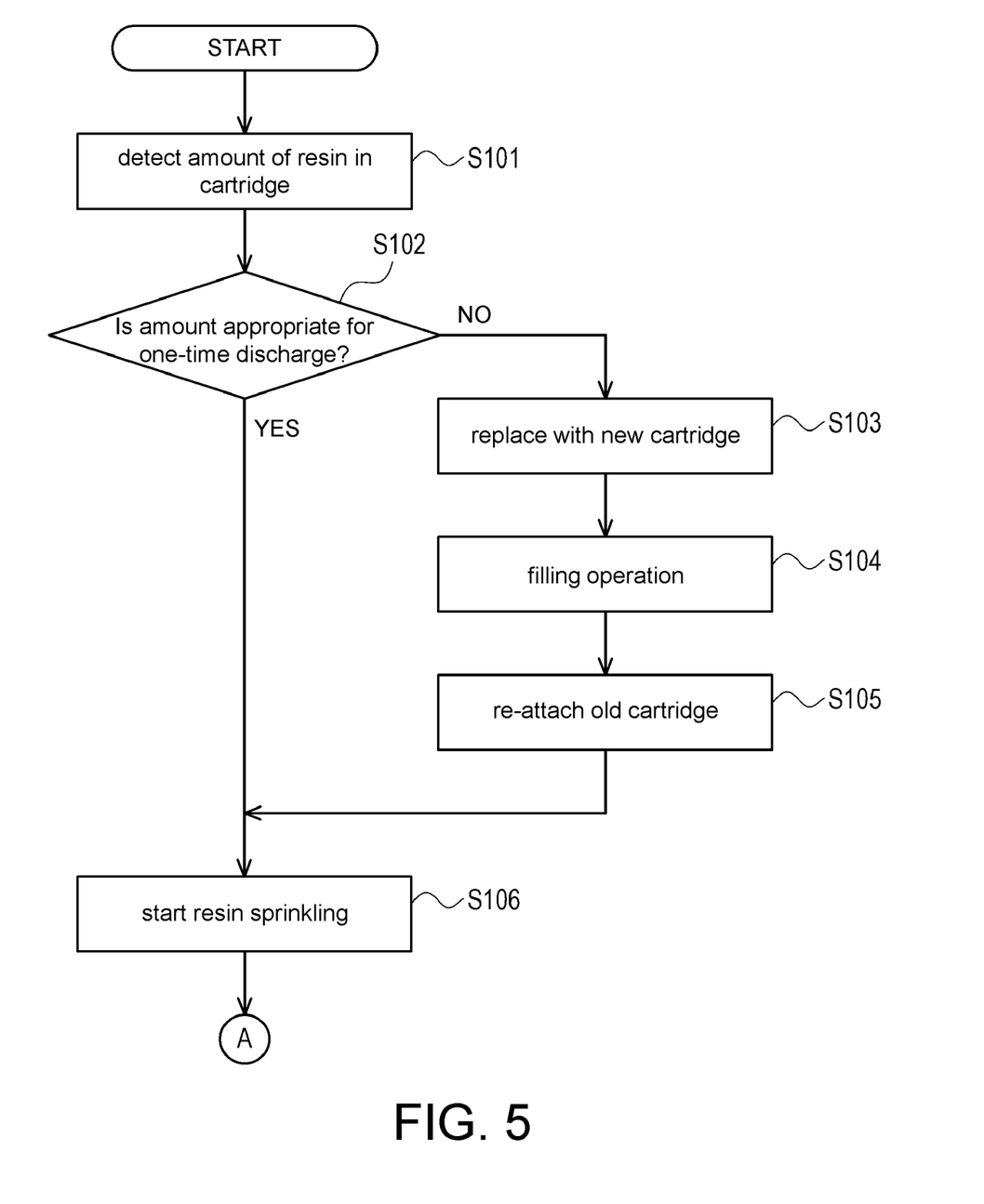
FIG. 5 is a flowchart illustrating a method for supplying a resin according to another embodiment of the disclosure.

In Step S101 illustrated in FIG. 5, the controller CTR detects the amount of the liquid resin 70 contained in the cartridge C held by the liquid resin discharging mechanism 23. Specifically, the controller CTR can detect the amount of liquid resin 70 in the cartridge C, using the resin level detecting sensor 23d and the rod location detecting sensor 23e. In this case, immediately after the liquid resin discharging mechanism 23 holds the new cartridge C (before the rod 23b is set on the cartridge C), the controller CTR detects the amount of the liquid resin 70 using the resin level detecting sensor 23d (refer to FIG. 2B). In this case, in a state where the liquid resin discharging mechanism 23 holds the cartridge C which is currently used (in a state where the rod 23b is set on the cartridge C), the controller CTR detects the amount of the liquid resin 70 using the rod location detecting sensor 23e (refer to FIG. 2A).

The controller CTR performs a process of Step S101 and, then, proceeds to a process of Step S102.

In Step S102, the controller CTR determines whether or not the amount (remaining amount) of the liquid resin 70 in the cartridge C detected in Step S101 remains to be larger than a target supply amount appropriate for one-time resin supply to the release film 12. Note that, in the embodiment, the target supply amount is an amount of liquid resin 70 which has to be supplied to a sheet of release film 12 and is an amount of liquid resin 70 appropriate for one-time resin molding performed by the resin molding module 30.

When the controller CTR determines that the amount (remaining amount) of liquid resin 70 in the cartridge C remains to be larger than the target supply amount (YES in Step S102), the controller CTR proceeds to Step S106. On the other hand, when the controller CTR determines that the amount (remaining amount) of liquid resin 70 in the cartridge C remains to be smaller (insufficient) than the target supply amount (NO in Step S102), the controller CTR proceeds to Step S103.

In Step S103, the controller CTR provisionally replaces the cartridge C (for convenience, this cartridge C is referred to as an "old cartridge C1") held by the liquid resin discharging mechanism 23 with a new cartridge C (for convenience, this cartridge C is referred to as a "new cartridge C2"). The new cartridge C2 for replacement is disposed at a cartridge providing unit 26 near the film suctioning board 24, for example (refer to FIG. 1). The controller CTR places the old cartridge C1 at the cartridge providing unit 26 and causes the liquid resin discharging mechanism 23 to hold the new cartridge C2 instead of the old cartridge. Note that, the old cartridge C1 and the new cartridge C2 are examples of a first cartridge and a second cartridge according to the disclosure, respectively.

The controller CTR performs a process of Step S103 and, then, proceeds to a process of Step S104.

Figure 7:
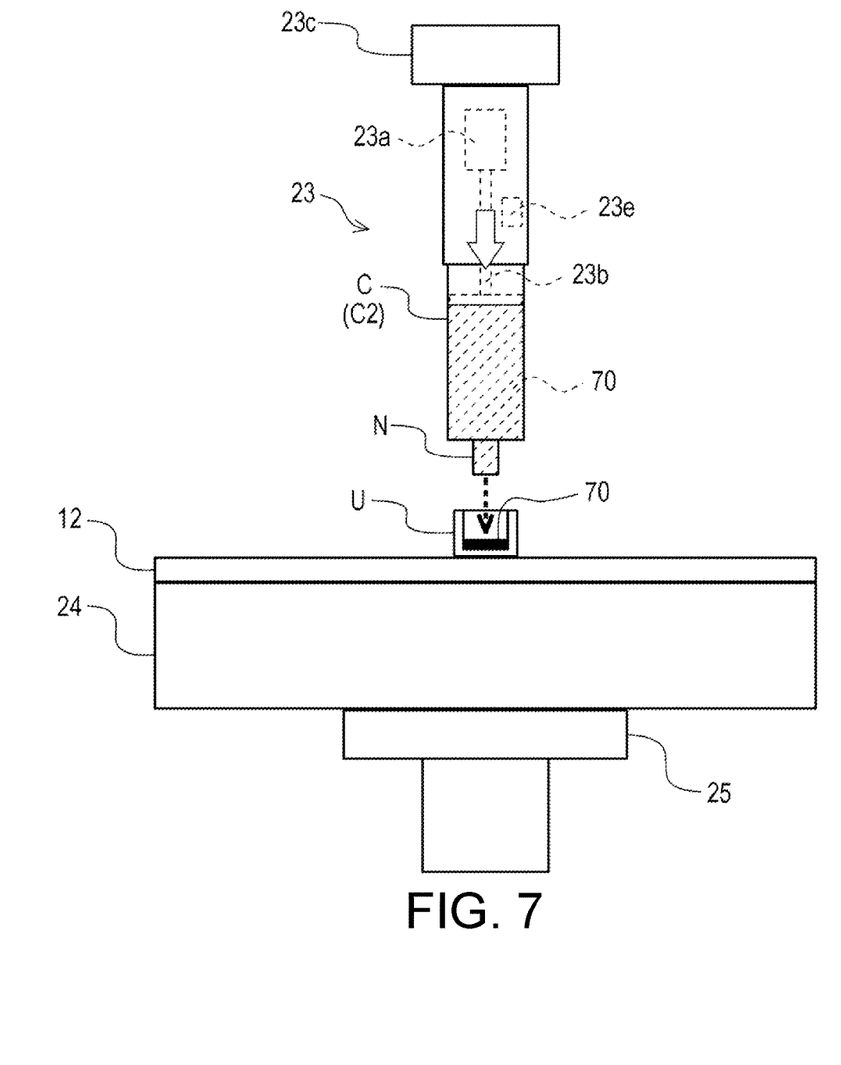
FIG. 7 is a side view illustrating an example of a filling operation performed by the liquid resin discharging mechanism.

In Step S104, the controller CTR fills the nozzle N of the new cartridge C2 with the liquid resin 70. Specifically, as illustrated in FIG. 7, the controller CTR disposed a container U above the film suctioning board 24, using an appropriate transport device. Then, the rod 23b is driven to push down the liquid resin 70 contained in the new cartridge C2 such that only a small amount of the liquid resin 70 is discharged (drips out) downward from the nozzle N to the container U. In this manner, a distal end (nozzle N) of the new cartridge C2 can be filled with the liquid resin 70.

In addition, in Step S104, the controller CTR checks whether or not the liquid resin discharging mechanism 23 normally discharges the liquid resin 70. Specifically, the controller CTR causes only a predetermined set amount of the liquid resin 70 to be discharged from the new cartridge C2. In addition, the controller CTR causes the weighing instrument 25 to measure weight of the discharged liquid resin 70. The controller CTR performs checking (operation checking and precision checking) of whether or not the liquid resin discharging mechanism 23 normally discharges the liquid resin 70, by comparing the set amount with the measured weight.

Moreover, when abnormality is found through the checking, the controller CTR can use an appropriate means (for example, screen display or sound notification) to notify a user of the abnormality.

The controller CTR performs the process of Step S104 and, then, proceeds to a process of Step S105.

In Step S105, the controller CTR again replaces the new cartridge C2 held by the liquid resin discharging mechanism 23 with the old cartridge C1. In other words, the controller CTR places the new cartridge C2 already subjected to dripping out at the cartridge providing unit 26 and causes the liquid resin discharging mechanism 23 to hold the old cartridge C1 instead of the new cartridge.

The controller CTR performs the process of Step S105 and, then, proceeds to a process of Step S106.

In Step S106, the controller CTR causes the liquid resin discharging mechanism 23 to start supply (resin sprinkling) of the liquid resin 70 to the release film 12. Specifically, as illustrated in FIG. 4, the controller CTR causes the liquid resin discharging mechanism 23 to discharge the liquid resin 70 while causing the liquid resin discharging mechanism to move in the horizontal direction (X direction and Y direction) and supplies the liquid resin 70 in the helical shape on the release film 12.

Here, when the controller CTR proceeds to Step S106 through the processes of Steps S103 to S105, the controller CTR performs resin supply from the old cartridge C1 in a state where preparation (dripping-out) of the new cartridge C2 is first performed.

The controller CTR performs the process of Step S106 and, then, proceeds to a process of Step S107.

Figure 6:
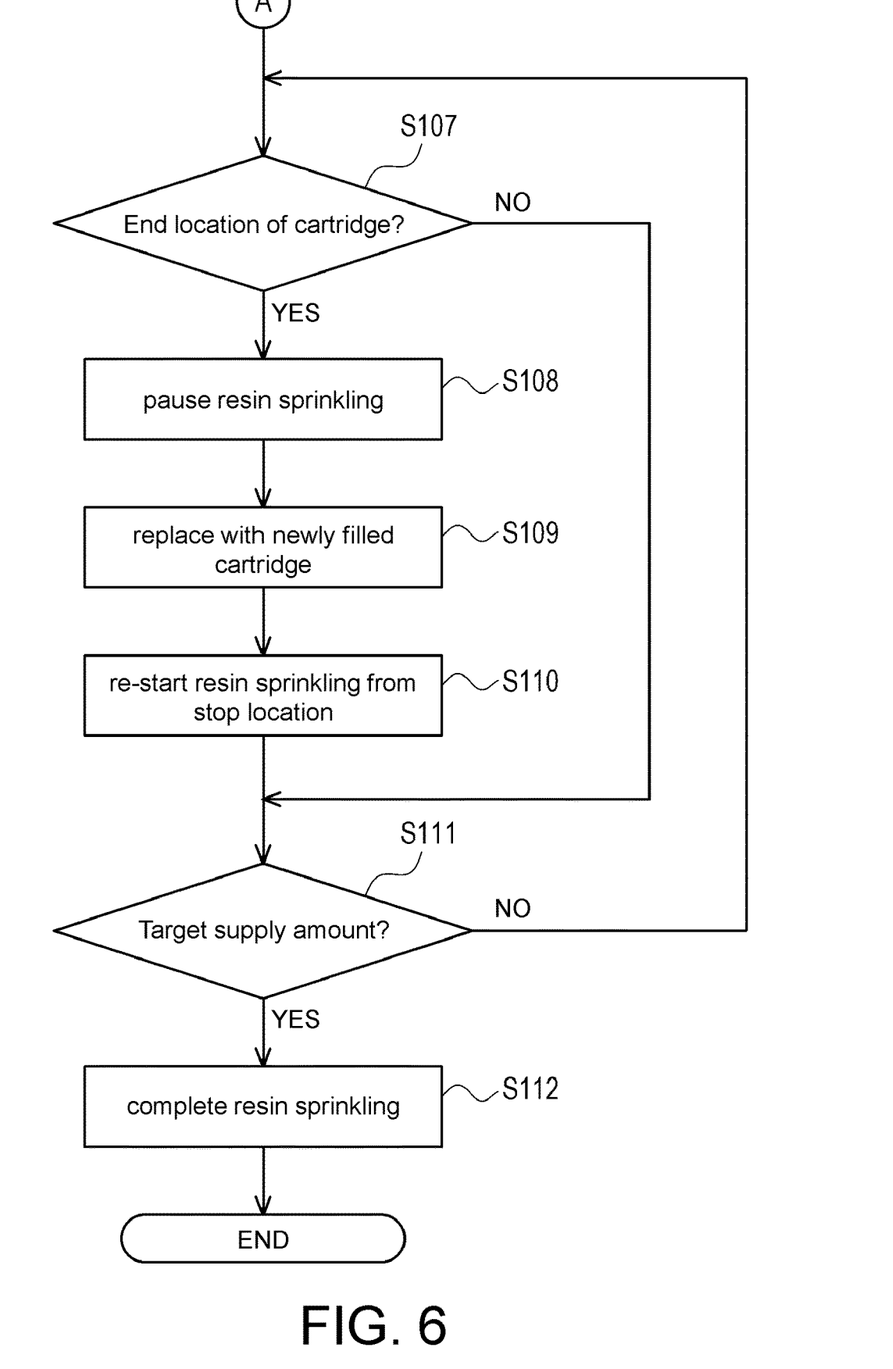
FIG. 6 is a flowchart illustrating a procedure continued from FIG. 5.

In Step S107 illustrated in FIG. 6, the controller CTR determines whether or not the rod 23b of the liquid resin discharging mechanism 23 reaches the lowermost location (end location) with respect to the cartridge C, using the rod location detecting sensor 23e. Note that, the end location is a location at the lowermost side in a movable range of the rod 23b with respect to the cartridge C. In other words, a state where the rod 23b reaches the end location means a state where the liquid resin 70 is discharged as much as possible from the cartridge C. The end location is set optionally in advance. In addition, the end location can be changed appropriately depending on a type of cartridge C.

When the controller CTR determines that the rod 23b reaches the end location of cartridge C (YES in Step S107), the controller CTR proceeds to Step S108. On the other hand, when the controller CTR determines that the rod 23b does not reach the end location of cartridge C (NO in Step S107), the controller CTR proceeds to Step S111.

In Step S108, the controller CTR causes the liquid resin discharging mechanism 23 to pause the supply (resin sprinkling) of the liquid resin 70 to the release film 12. Specifically, the controller CTR stops movement of the liquid resin discharging mechanism 23 in the horizontal direction (X direction and Y direction) and stops discharging of the liquid resin 70 (lowering of the rod 23b). In this case, the controller CTR stores a location at which the liquid resin discharging mechanism 23 stops, using a coordinate of the horizontal direction (coordinate in the X direction and the Y direction).

Moreover, the controller CTR stops the discharging of the liquid resin 70 and, then, causes the cartridge C to perform reciprocating movement (liquid dripping operation) a plurality of times in an up-down direction. In this manner, the liquid resin 70 attached to the cartridge C (nozzle Z) can be dropped onto the release film 12.

The controller CTR performs a process of Step S108 and, then, proceeds to a process of Step S109.

In Step S109, the controller CTR replaces the old cartridge C1 held by the liquid resin discharging mechanism 23 with the new cartridge C2 having the nozzle N on which filling (dripping out) is performed in Step S104.

The controller CTR performs the process of Step S109 and, then, proceeds to a process of Step S110.

In Step S110, the controller CTR causes the liquid resin discharging mechanism 23 to re-start the supply of the liquid resin 70 from the location (paused location) stored in Step S108. Specifically, the controller CTR causes the liquid resin discharging mechanism 23 holding the new cartridge C2 to move to the paused location in Step S108. The controller CTR causes the liquid resin discharging mechanism 23 to again move in the horizontal direction along the helical route from the location and discharge the liquid resin 70. In other words, in the embodiment, the location (stop location) at which the supply of the liquid resin 70 is stopped in Step S108 is the same as the location (start location) at which supply of the liquid resin 70 is re-started in Step S110.

In this manner, a re-start of resin supply along the helical route which is continuous from the same location (start location) as the stop location can inhibit the liquid resin 70 from being repeatedly supplied to the same route, therefore achieving uniform sprinkling of the liquid resin 70.

Moreover, in Step S110, there is no need to absolutely re-start discharging of the liquid resin 70 from the stop location in Step S108. For example, a location slightly deviated from the stop location as a reference (for example, slightly downstream side along the helical route) may be set as a start location, and discharging of the liquid resin 70 may be re-started from the start location. In this manner, the liquid resin 70 is inhibited from being repeatedly supplied to the stop location such that uniform sprinkling of the liquid resin 70 on the release film 12 can be more effectively achieved.

The controller CTR performs the process of Step S110 and, then, proceeds to a process of Step S111.

In Step S111, the controller CTR determines whether or not the weight of the liquid resin 70 discharged on the release film 12 reaches the target supply amount, using the weighing instrument 25. When the controller CTR determines that the weight of the liquid resin 70 reaches the target supply amount (YES in Step S111), the controller CTR proceeds to Step S112. On the other hand, when the controller CTR determines that the weight of the liquid resin 70 does not reach the target supply amount (NO in Step S111), the controller CTR proceeds to Step S107 again and repeats the processes from Step S107, until the weight of the liquid resin 70 reaches the target supply amount.

In Step S112, the controller CTR causes the liquid resin discharging mechanism 23 to stop and end the supply (resin sprinkling) of the liquid resin 70 to the release film 12. In addition, the controller CTR performs the liquid dripping operation from the cartridge C, similar to that in Step S108. At that time, the liquid resin 70 remaining in the cartridge C held by the liquid resin discharging mechanism 23 is used for the next supply of the liquid resin 70 to the release film 12.

The release film 12, to which the target supply amount of liquid resin 70 has been supplied in this state, is transported to the molding die 31 as described above, and resin molding is performed.

In this manner, when the remaining amount of the liquid resin 70 in the old cartridge C1 is smaller than the target supply amount (NO in Step S102), a filling operation of the new cartridge C2 is performed in advance (Step S104), and the liquid resin 70 starts to be discharged from the old cartridge C1 (Step S106). Besides, at a time point when no remaining amount of the old cartridge C1 is detected (YES in Step S107), the resin supply is paused (Step S108), and replacement with the new cartridge C2 is performed (Step S109). As described above, replacement of the cartridge C in the middle of one-time resin supply (resin supply to a sheet of release film 12) enables the liquid resin 70 in the cartridge C1 having the remaining amount smaller than the target supply amount to be used up as much as possible without discarding the liquid resin 70, and thus a reduction in manufacturing costs can be achieved. In addition, replacement with the new cartridge C2 on which the dripping out is performed in advance enables a replace time to be shortened and enables the resin supply to be promptly re-started. Hence, the state of the liquid resin 70 supplied to the release film 12 can be inhibited from changing over an elapsed time during the replacement, therefore enabling the appropriate resin supply to be performed.

As described above, the method for supplying a resin according to the embodiment includes:

a primary resin supplying step (Step S106) of supplying the liquid resin 70 contained in the old cartridge C1 (first cartridge) to the release film 12 (supply target), the old cartridge having the remaining amount of liquid resin smaller than the target supply amount appropriate for one-time resin supply to the release film 12;

a cartridge replacing step (Step S109) of replacing, after the primary resin supplying step, the old cartridge C1 with the new cartridge C2 (second cartridge) already subjected to dripping out; and a secondary resin supplying step (Step S110) of supplying the liquid resin 70 contained in the new cartridge C2 to the release film 12 after the cartridge replacing step.

In a configuration described above, appropriate replacement of the cartridge C enables resin supply to be performed appropriately. In addition, the liquid resin 70 in the old cartridge C1 can be used as much as possible, and thus a waste amount of the liquid resin 70 can be reduced (reduction in manufacturing costs).

In addition, in the secondary resin supplying step (Step S110), supply of the liquid resin 70 is started from the start location determined based on the stop location where supply of the liquid resin 70 from the old cartridge C1 is stopped in the primary resin supplying step (Step S106).

In a configuration described above, the liquid resin 70 can be uniformly supplied to the release film 12. In other words, an appropriate location is set as the start location based on the stop location, and thereby the liquid resin 70 can be inhibited from being supplied to overlapped locations, and thus the liquid resin 70 can be uniformly supplied.

In addition, the stop location and the start location are set using the coordinate of the two directions (X direction and Y direction) orthogonal to each other on the horizontal plane.

In a configuration described above, the stop location and the start location can be easily controlled. In other words, since the stop location or the like can be controlled using the simple coordinate of the two directions, the location can be easily controlled.

In addition, in the primary resin supplying step (Step S106), the supply of the liquid resin 70 from the old cartridge C1 is stopped, based on the location of the rod 23b (supply member) which pushes out and supplies the liquid resin 70 contained in old first cartridge C1.

In a configuration described above, a remaining amount of the liquid resin 70 at a stop timing of the supply of the liquid resin 70 can be easily detected. In other words, the location of the rod 23b is detected using the rod location detecting sensor 23e, and thereby the remaining amount of the liquid resin 70 contained in the old cartridge C1 which is difficult to visually recognize from outside can be easily detected.

In addition, the method for supplying a resin according to the embodiment further includes a remaining-resin amount measuring step (Step S101) of measuring the remaining amount of the liquid resin 70 contained in the old cartridge C1, before the primary resin supplying step (Step S106).

In a configuration described above, the remaining amount in the old cartridge C1 is grasped in advance, and thereby a need for replacement with the new cartridge C2, and thus a need for a filling operation (dripping out) can be grasped. In this manner, a process of the filling operation (Step S104 or the like) can be omitted, when there is no need for replacement, and work processes can be simplified.

In addition, in the remaining-resin amount measuring step (Step S101), the remaining amount of the liquid resin 70 contained in the old cartridge C1 can be measured, based on the location of the rod 23b (supply member) which pushes out and supplies the liquid resin 70 contained in the old cartridge C1.

In a configuration described above, the remaining amount of the liquid resin 70 can be easily detected.

In addition, the method for supplying a resin according to the embodiment further includes dripping-out steps (Steps S103 to S105) of replacing the old cartridge C1 attached to the liquid resin discharging mechanism 23 (liquid resin supplying mechanism) which supplies the liquid resin 70 to the release film 12 with the new cartridge C2 after the remaining-resin amount measuring step (Step S101) and before the primary resin supplying step (Step S106), performing dripping-out of the new cartridge C2 using the liquid resin discharging mechanism 23, and again replacing the new cartridge C2 attached to the liquid resin discharging mechanism 23 with the old cartridge C1.

In a configuration described above, the apparatus can be simplified. In other words, since the dripping-out can be performed using the liquid resin discharging mechanism 23 that supplies the liquid resin 70, there is no need to prepare an additional mechanism for the dripping-out. Hence, the apparatus can be simplified.

In addition, in the dripping-out steps (Steps S103 to S105), whether or not the liquid resin 70 contained in the new cartridge C2 already subjected to dripping out can be normally supplied from the liquid resin discharging mechanism 23 is checked.

In a configuration described above, an operation of the liquid resin discharging mechanism 23 can be checked together with the dripping-out. Particularly in the embodiment, the operation can be checked or the like using the weighing instrument 25 that measures the weight of the liquid resin 70 supplied to the release film 12, and thus the work processes can be efficiently performed.

In addition, the method for manufacturing a resin molded product according to the embodiment is a method in which the resin molded product is manufactured using the liquid resin 70 supplied by the method for supplying a resin.

In a configuration described above, appropriate replacement of the cartridge C enables resin supply to be performed appropriately.

In addition, the resin molding apparatus 1 according to the embodiment includes:
the molding die 31 including the upper die 34 and the lower die 32 which faces the upper die 34;
the die clamping mechanism 35 that clamps the molding die 31; and the liquid resin discharging mechanism 23 (liquid resin supplying mechanism) that supplies the liquid resin 70 which is to be used in the molding die 31.

The liquid resin discharging mechanism 23 supplies the liquid resin 70 contained in the old cartridge C1 (first cartridge) to the release film 12 (supply target), the old cartridge having the remaining amount of liquid resin smaller than the target supply amount appropriate for one-time resin supply to the release film 12, replaces the old cartridge C1 with the new cartridge C2 (second cartridge) already subjected to dripping out, and supplies the liquid resin 70 contained in the new cartridge C2 to the release film 12. In a configuration described above, appropriate replacement of the cartridge C enables resin supply to be performed appropriately. In addition, the liquid resin 70 in the old cartridge C1 can be used as much as possible, and thus a waste amount of the liquid resin 70 can be reduced (reduction in manufacturing costs).

As described above, the embodiments of the disclosure are described; however, the disclosure is not limited to the embodiments described above and can be appropriately modified within a scope of technical ideas of invention described in claims.

For example, in the embodiment, an example in which the liquid resin discharging mechanism 23 supplies the liquid resin 70 while moving along the helical route is described; however, the disclosure is not limited thereto, and the movement route of the liquid resin discharging mechanism 23 can be optionally changed. In addition, the liquid resin 70 can be supplied to one location on the release film 12 without movement of the liquid resin discharging mechanism 23.

In addition, in the embodiment, a configuration in which the amount of the liquid resin 70 in the cartridge C is detected using the resin level detecting sensor 23d and the rod location detecting sensor 23e is exemplified; however, the disclosure is not limited thereto, and the amount of the liquid resin 70 in the cartridge C can be detected by any methods of using a weight sensor or the like, for example.

In addition, the embodiment is configured to include the film placing board 13 and the film suctioning board 24; however, the film placing board 13 and the film suctioning board 24 may be formed by a common board such that the embodiment may be configured to have only the film suctioning board 24. In this case, the film suctioning board 24 can move in the X, Y, and Z directions and can move between the release film cutting module 10 and the resin supply module 20. The film suctioning board 24, on which the release film 12 is disposed, is moved to a location below a resin discharging unit of the resin supply module 20. In this state, the liquid resin 70 is discharged onto the release film 12.

What is claimed is:

1. A method for supplying a resin, comprising:
performing liquid resin discharging operations for supplying a liquid resin to a supply target;
wherein the liquid resin discharging operations comprise:
supplying the liquid resin contained in a first cartridge, which is held by a liquid resin discharging mechanism, to the supply target by pushing out the liquid resin by using a rod, wherein the first cartridge has a remaining amount of the liquid resin smaller than a target supply amount appropriate for a one-time resin supply to the supply target;
after supplying the liquid resin contained in the first cartridge to the supply target, replacing the first cartridge held by the liquid resin discharging mechanism with a second cartridge already subjected to dripping out so that the second cartridge is held by the liquid resin discharging mechanism;
after replacing the first cartridge with the second cartridge, supplying the liquid resin contained in the second cartridge, which is held by the liquid resin discharging mechanism, to the supply target by pushing out the liquid resin by using the rod;
before supplying the liquid resin contained in the first cartridge to the supply target, measuring a remaining amount of the liquid resin contained in the first cartridge; and
after measuring the remaining amount of the liquid resin contained in the first cartridge and before supplying the liquid resin contained in the first cartridge to the supply target, replacing the first cartridge held by the liquid resin discharging mechanism with the second cartridge, performing dripping out of the second cartridge using the liquid resin discharging mechanism, and again replacing the second cartridge held by the liquid resin discharging mechanism with the first cartridge.

2. The method for supplying a resin according to claim 1, wherein
when supplying the liquid resin contained in the second cartridge to the supply target, the supply of the liquid resin is started from a start location determined based on a stop location, and the stop location is where the supply of the liquid resin from the first cartridge to the supply target is stopped.

3. The method for supplying a resin according to claim 2, wherein
the stop location and the start location are set using a coordinate of two directions orthogonal to each other on a horizontal plane.

4. The method for supplying a resin according to claim 1, wherein
when supplying the liquid resin contained in the first cartridge to the supply target, the supply of the liquid resin from the first cartridge is stopped based on a location of the rod.

5. The method for supplying a resin according to claim 1, wherein
when measuring the remaining amount of the liquid resin contained in the first cartridge, the remaining amount of the liquid resin contained in the first cartridge is capable of being measured based on a location of the rod.

6. The method for supplying a resin according to claim 1, wherein the liquid resin discharging operations further comprise:
checking whether or not the liquid resin contained in the second cartridge already subjected to the dripping out is capable of being normally supplied from the liquid resin discharging mechanism.

7. A method for manufacturing a resin molded product, wherein
the resin molded product is manufactured using the liquid resin supplied by the method for supplying a resin according to claim 1.

8. A resin molding apparatus comprising:
a molding die including an upper die and a lower die which faces the upper die;
a die clamping mechanism that clamps the molding die; and
a liquid resin discharging mechanism that supplies, to a supply target, a liquid resin which is to be used in the molding die; and
a controller configured to control operations of a liquid resin discharging mechanism,
wherein the operations of the liquid resin discharging mechanism comprise:
supplying a liquid resin contained in a first cartridge, which is held by a liquid resin discharging mechanism, to a supply target by pushing out the liquid resin by using a rod, wherein the first cartridge has a remaining amount of liquid resin smaller than a target supply amount appropriate for a one-time resin supply to the supply target,
replacing the first cartridge held by the liquid resin discharging mechanism with a second cartridge already subjected to dripping out so that the second cartridge is held by the liquid resin discharging mechanism,
supplying a liquid resin contained in the second cartridge, which is held by the liquid resin discharging mechanism, to the supply target by pushing out the liquid resin by using the rod,
before supplying the liquid resin contained in the first cartridge to the supply target, measuring the remaining amount of the liquid resin contained in the first cartridge, and
after measuring the remaining amount of the liquid resin contained in the first cartridge and before supplying the liquid resin contained in the first cartridge to the supply target, replacing the first cartridge held by the liquid resin discharging mechanism which supplies a liquid resin to the supply target with the second cartridge, performing dripping out of the second cartridge using the liquid resin discharging mechanism, and again replacing the second cartridge held by the liquid resin discharging mechanism with the first cartridge.

* * * * *